United States Patent [19]

Cooper et al.

[11] Patent Number: 4,804,466
[45] Date of Patent: Feb. 14, 1989

[54] FLUID FILTER WITH INTERNAL SPACER

[75] Inventors: Richard D. Cooper, Williston Park; Ojars W. Pincers, New York, both of N.Y.

[73] Assignee: Allomatic Industries, Inc., New York, N.Y.

[21] Appl. No.: 763,563

[22] Filed: Aug. 8, 1985

[51] Int. Cl.⁴ .............................................. B01D 35/02
[52] U.S. Cl. .................................... 210/168; 210/316; 210/489; 210/416.5; 55/501
[58] Field of Search ............... 210/168, 314, 316, 317, 210/416.5, 489; 56/490, 501, 529

[56] References Cited

U.S. PATENT DOCUMENTS

| | | | |
|---|---|---|---|
| 1,989,795 | 2/1935 | Fellows | 210/165 |
| 2,966,269 | 12/1960 | Allen | 210/314 |
| 3,371,793 | 3/1968 | Fowler | 210/445 |
| 3,493,119 | 2/1970 | Allen | 210/489 |
| 3,735,871 | 5/1973 | Bisko | 210/489 |
| 3,784,011 | 1/1974 | Ward | 210/168 |
| 3,971,722 | 7/1976 | Radford | 210/489 |
| 4,052,318 | 10/1977 | Krebs | 210/489 |
| 4,136,011 | 1/1979 | Joseph et aL. | 210/168 |
| 4,234,428 | 11/1980 | Schnell | 210/314 |
| 4,264,443 | 4/1981 | Anderson | 210/168 |
| 4,352,737 | 10/1982 | Taniguchi | 210/455 |
| 4,387,023 | 6/1983 | Napier | 210/168 |
| 4,402,827 | 9/1983 | Joseph | 210/314 |

Primary Examiner—Richard V. Fisher
Assistant Examiner—Wanda L. Millard
Attorney, Agent, or Firm—James & Franklin

[57] ABSTRACT

In a fluid filter having a filter medium comprising upper and lower layers defining therebetween a fluid receiving space into which the fluid to be filtered is introduced, a spacer is positioned between those layers in order positively to hold them apart, thereby significantly to increase the filtering capacity of the filter unit.

14 Claims, 6 Drawing Sheets

FLUID FILTER WITH INTERNAL SPACER

The present invention relates to the construction of a fluid filter, such as the one used for the filtration of transmission fluid in automotive vehicles, in which the filtration is performed by a filter sheet comprising upper and lower layers defining therebetween a fluid receiving space into which the fluid to be filtered is introduced, and in particular to increasing the filtration capacity of such a unit.

Filter units of the type under discussion generally comprise a structural framework within which a filtration medium, usually in sheet form, is mounted, the filter unit comprising a fluid receiving space on one side of the filter sheet, into which space the fluid to be filtered is introduced, the fluid then passing through the filter sheet into an outlet space, from which the filtered fluid escapes from the housing. In one quite widely used construction of this type, the filter sheet is provided in two layers, as by being doubled over into a "bag" or "pocketbook" configuration, to define between the layers the fluid receiving space into which the fluid to be filtered is initially received. With this doubled-over type of filter sheet arrangement, the effective filtration area is maximized. However, particularly when the filter unit is shaped to a more or less flat configuration, as is generally the case, several factors have minimized the effect of that maximization of filtration area.

First, the filter units are usually formed of two structural walls designed to be secured to one another along a horizontal plane with the filter sheet at its periphery being sealed to the frame pieces at the horizontal joining line. This brings the two layers of the filters close to one another at the periphery of the fluid receiving space, thus minimizing the volume of that fluid receiving space and hence the volume of the fluid which can be received between and passed through the filter sheet.

Second, the two layers of the filter sheet can, of course, separate from one another to a greater extent towards the center of the unit, thereby, at least theoretically, to produce a fluid receiving space of acceptable volume. However, the filter assembly must also provide means for facilitating the flow of oil that has passed through the filter to the exit port of the filter. This is usually accomplished by providing projections from the outer walls of the filter assembly which engage the filter sheet layers and keep them spaced from the outer walls, thus limiting the degree to which the filter sheets can separate from one another, and back pressure exerted by the oil which has passed through the filter sheets tends to urge those sheets toward one another, thereby to minimize the volume of the fluid receiving space. In addition, the flow of oil through the filter proper tends to produce a Venturi effect which sucks the filter sheets toward one another.

The restriction of filtering capacity produced by these design problems is often manageable, even though undesirable, at normal operating temperatures, but as operating temperatures drop, causing the liquid being filtered to become more viscous, the problem intensifies.

It is the prime object of the present invention to devise a fluid filter assembly construction which will, without affecting the external dimensions or mounting characteristics of a fluid filter assembly, maximize the filtration efficiency thereof.

It is another object of the present invention to provide a construction, in a fluid filter assembly comprising a filter sheet having upper and lower layers defining therebetween a fluid receiving space, which ensures that those two layers are significantly and positively spaced from one another except at their periphery.

It is yet another object of the present invention to accomplish the above by a simple, sturdy and inexpensive construction.

In accordance with the present invention spacing means are provided within the "bag" formed by the upper and lower sheets of the filter medium which positively retain those sheets spaced from one another. It is preferred, for constructional as well as functional reasons, to provide the spacer adjacent one of the ports through which the fluid to be filtered passes in the course of filtration. Preferably that spacer is so constructed as not to significantly impede the flow of fluid from one side of the spacer to the other, this being accomplished, as here specifically disclosed, through the use of a skeletonized spacer or a spacer having a plurality of separated stand-off parts, the fluid to be filtered flowing readily through the spaces defined by the said skeletonic structure or between the stand-off parts.

To the accomplishment of the above, and to such other objects as may hereinafter appear, the present invention relates to the construction of a fluid filter assembly as defined in the appended claims and as described in this specification taken together with the accompanying drawings in which:

Figure 9:
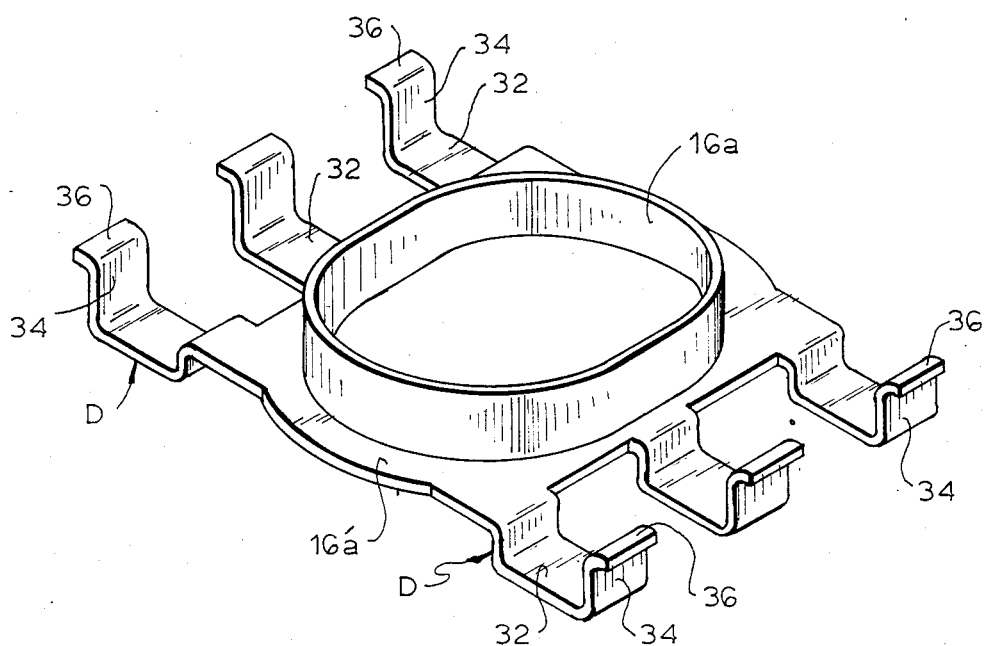
Figure 6:
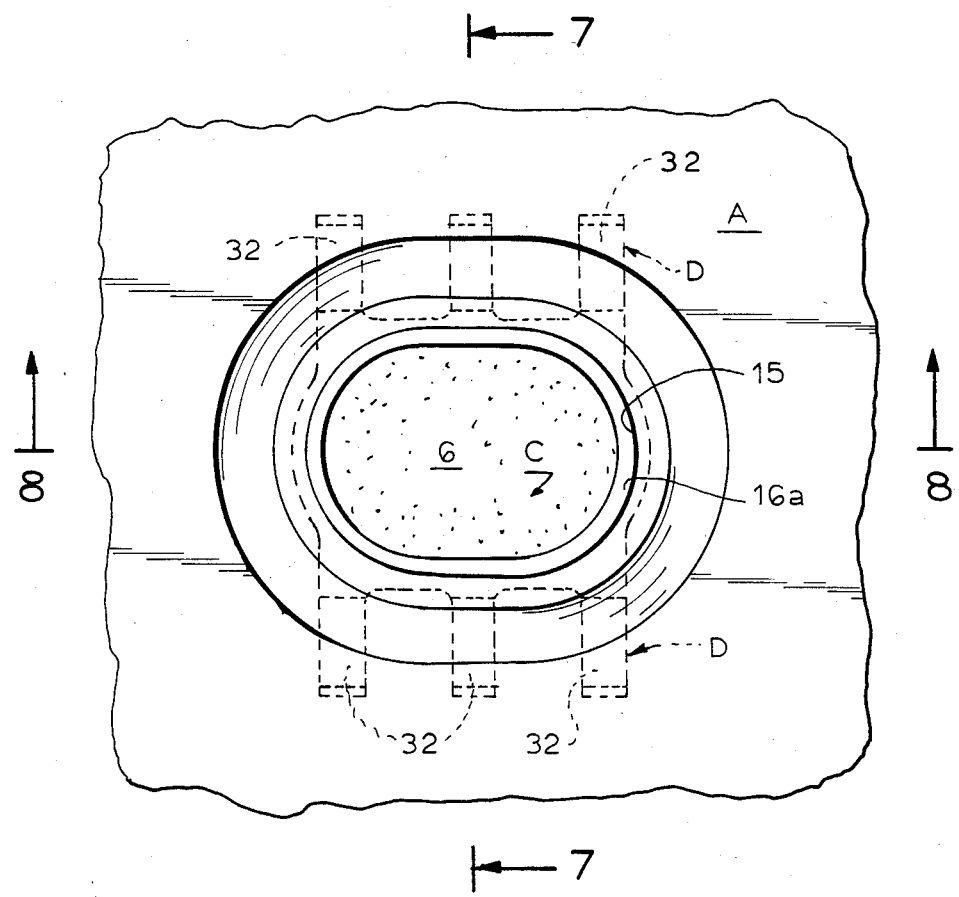
FIG. 6 is a fragmentary top plan view of a second embodiment of the present invention.
Figure 7:
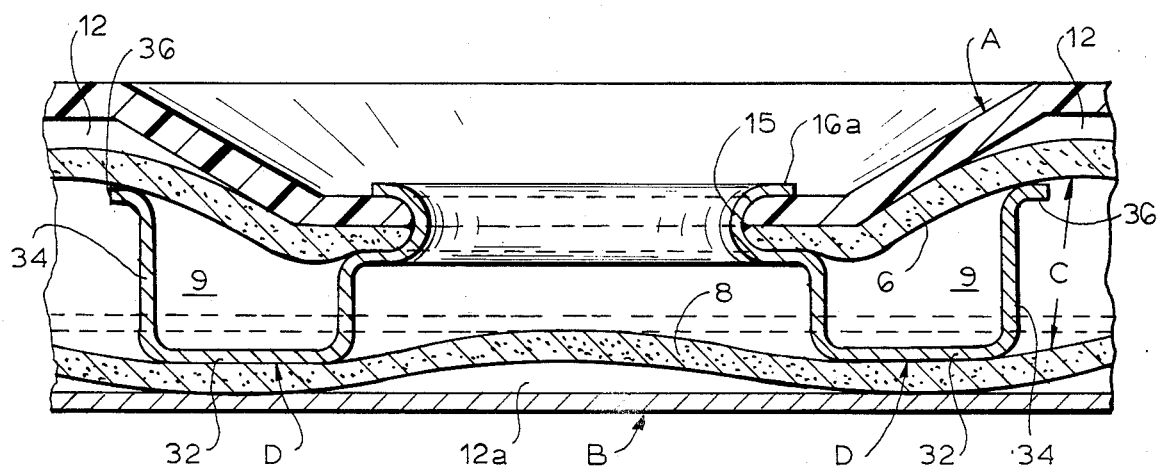
Figure 8:
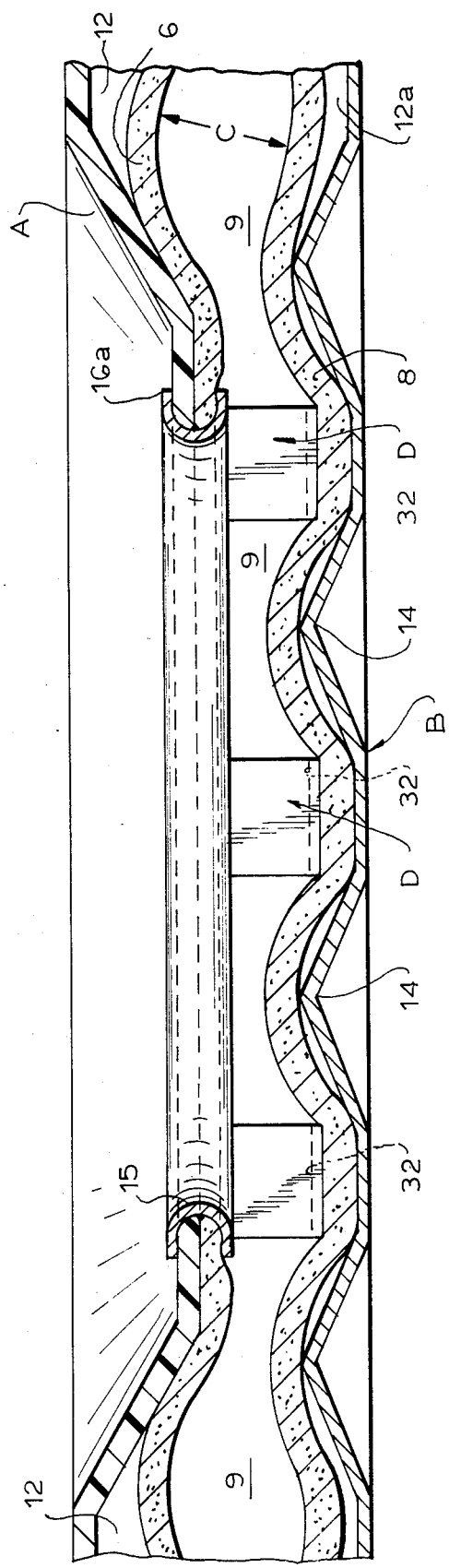

FIGS. 7 and 8 are cross-sectional views on an enlarged scale taken along the lines 7—7 and 8—8 of FIG. 6, respectively; and FIG. 9 is a three-quarters perspective view of the combined spacer and sealing element of the embodiment of FIGS. 6-8.

For purposes of illustration the invention is here disclosed and embodied in a flat-type filter such as is used for filtering the transmission fluid of automobiles. The filter assembly comprises a top cover wall generally designated A and a bottom cover wall generally designated B (the terms "top" and "bottom" are arbitrarily defined), the former being made of plastic and the latter of metal, sealingly joined to one another around their periphery by crimping the bottom wall B, at 2, over the edge of the top cover sall A. The filtration medium, generally designated C, is defined by an upper layer 6 and lower layer 8, those layers preferably being formed from a single sheet of filter material folded back on itself. The layers 6 and 8 of the filter are engaged and sealingly compressed along their peripheries (except where they are folded back on one another) between the upper cover wall A and the lower cover wall B at the crimped portion thereof, so that the space 9 between the two layers 6 and 8 defines a fluid receiving space of appreciable volume, that volume, however, depending upon the layers 6 and 8 being vertically spaced from one another. The upper cover wall A may be provided with downwardly extending ribs which space the upper layer 6 from the upper cover wall A, thereby to produce a chamber 12 therebetween. The lower cover wall B is provided with upwardly stamped ribs 14 (see FIG. 3) which space the lower layer 8 from the lower cover wall B, thereby to form a chamber 12a therebetween. The upper cover wall A is provided with an elongated opening 15, which usually defines the intake port for the space 9, and the upper filter layer 6 is similarly apertured and is sealingly engaged with the upper cover wall A around that opening 15, as by being crimped thereto by a properly shaped metal eyelet 16. In the embodiment here specifically disclosed the upper cover wall B is provided adjacent one end of the assembly with an upstanding pipe 18 which communicates with the chambers 14 and 14a defined by the spaces between the upper and lower cover walls A and B and the upper and lower layers 6 and 8 of the filtration medium C respectively which define the chambers 14 and 14a. The pipe 18 thus functions as an exit opening for the filter and it also, in this particular embodiment, serves as the means for supporting the filter assembly in place in the vehicle, usually while being immersed in a bath of transmission fluid or the like.

In accordance with the present invention a spacer means generally designated D is provided inside the filter "bag", between the filter layers 6 and 8, in order positively to retain those layers spaced from one another to an optimal degree. As has been seen, those layers are secured to one another at the periphery of the "bag". The spacer means D is therefore located at a position relatively remote from the periphery of the layers 6 and 8. A convenient location for the spacer means D is at the opening 15 defining the intake port. This location is preferred in part because it is relatively easy from a manufacturing and assembly viewpoint to so locate the spacer means D and in part because such a location of the spacer means D ensures ready flow of the fluid to be filtered into the "bag", that fluid thereafter having a tendency to retain the filter bag in distended and hence high-volume condition.

In the embodiment of FIGS. 1-5 the spacer means D is in skeletonic form, being defined by a relatively thin but self-sustainable strip of material 19 bent into a somewhat U shape so as to comprise longitudinally extending legs 20 connected by a reverse bend portion 22, the legs 20 and reverse bend portion 22 further being vertically zig-zag shaped so as to define upper vertices 24 and lower vertices 26 spaced along the length of the strip, the vertical spacing between vertices 24 and 26 coinciding with the desired vertical spacing of the filter layers 6 and 8, the upper vertices 24 engaging the upper filter layer 6 and the lower vertices 26 engaging the lower filter layer 8. As may best be seen from FIG. 1, the U-shape of this spacing means D is such as preferably not to obstruct the inlet port defined by the opening 15. Moreover, because of the skeletonic nature of the strip it offers very little resistance to the flow of fluid through the filter, the fluid flowing readily through the spaces between the zig-zag portions of the strip.

Figure 5:
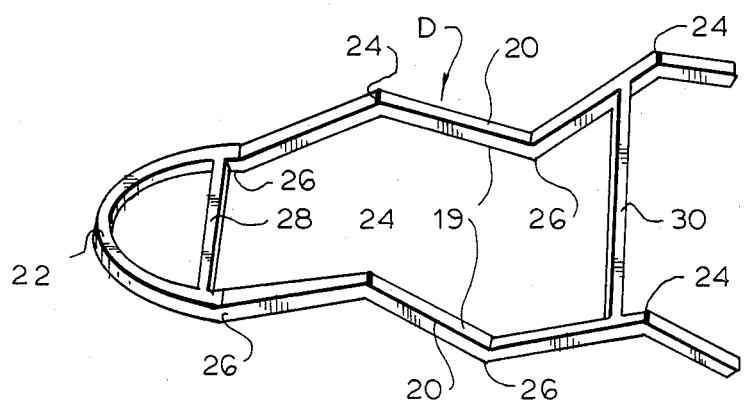
FIG. 5 is a three-quarters perspective view of an alternative embodiment of the type of spacer element shown in FIGS. 1-4.

In the embodiment of FIGS. 1-4 the legs 20 are connected to one another only by the reverse bend portion 22. This permits the unit to be laterally compressed so that it can be inserted between the filter layers 6 and 8 by moving it through the opening 15 and then permitting it to expand to its position as shown. While this has a certain assembly advantage, it is sometimes offset by a tendency of the spacer means D to lose its shape after it has been inserted. Hence the spacer means D as illustrated in FIG. 5 may be employed. There bars 28 and 30 are secured to and extend between the legs 20, thereby rigidifying the unit.

Figure 1:
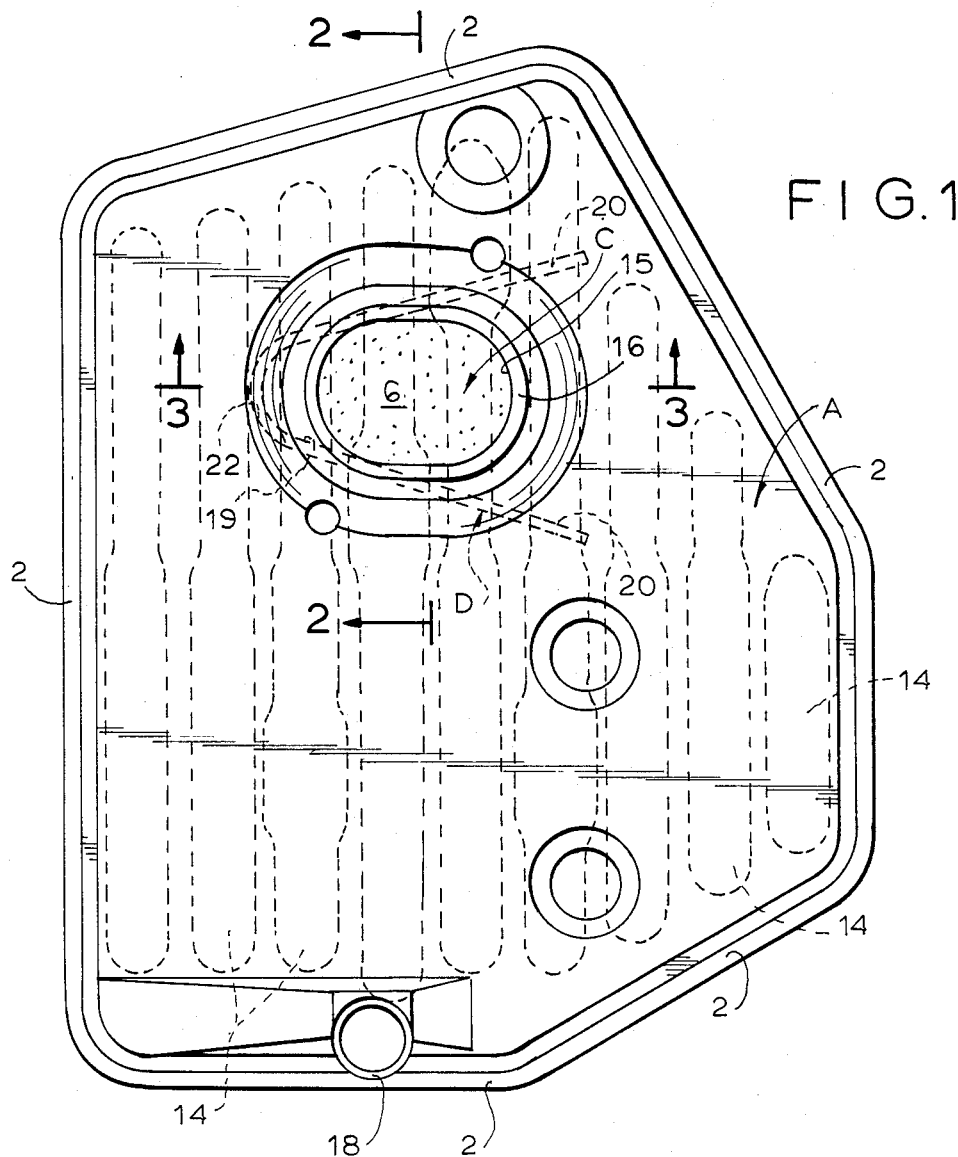
FIG. 1 is a top plan view of a typical embodiment of the present invention.
Figure 2:
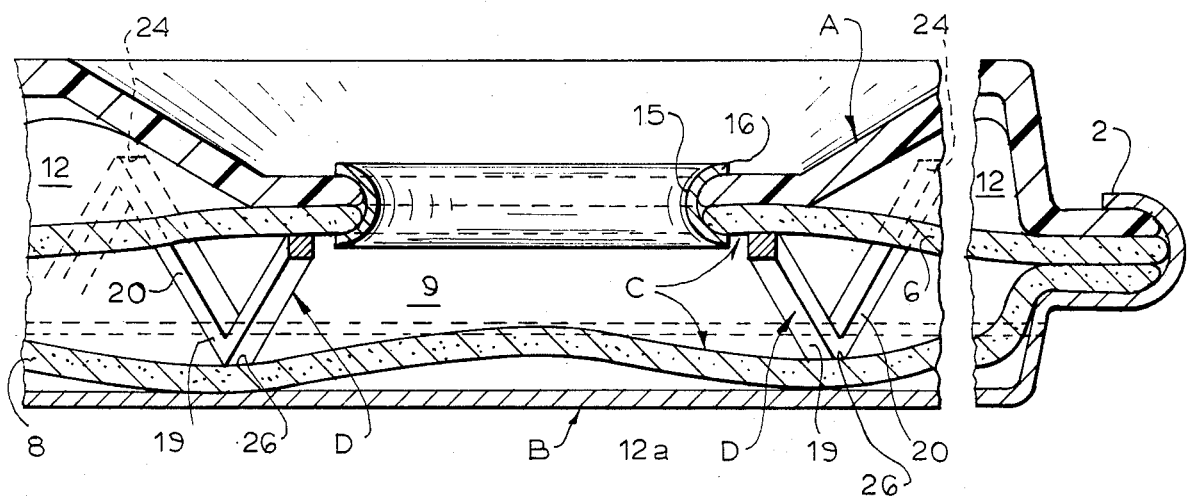
FIG. 2 is a fragmentary cross-sectional view on an enlarged scale taken along the line 2—2 of FIG. 1.
Figure 3:
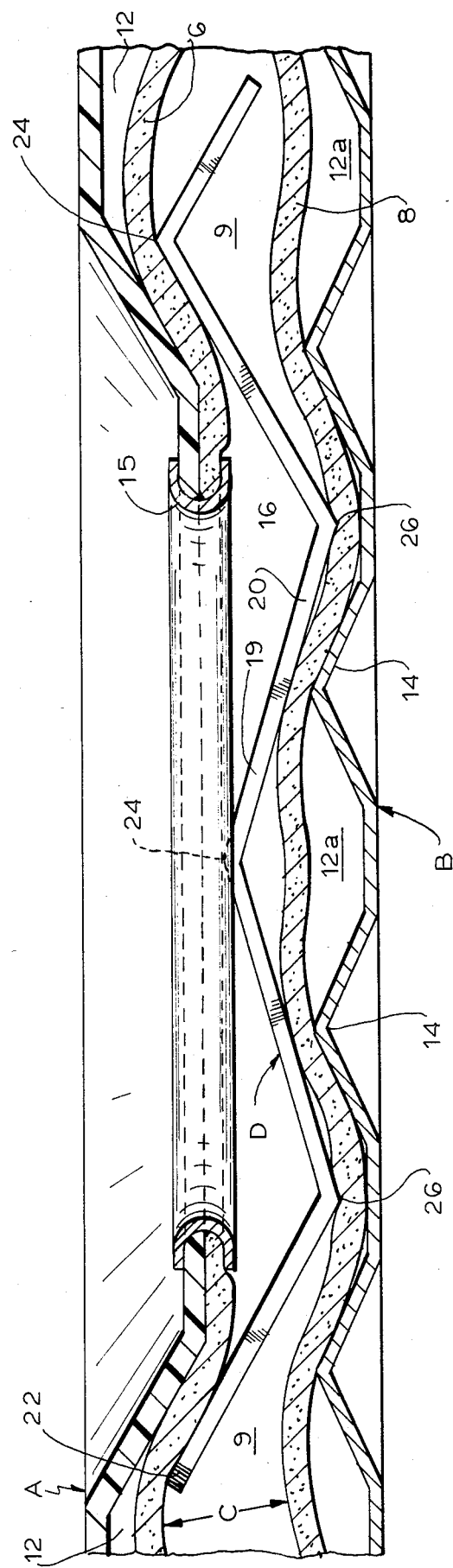
FIG. 3 is a fragmentary cross-sectional view on an enlarged scale taken along the line 3—3 of FIG. 1.
Figure 4:
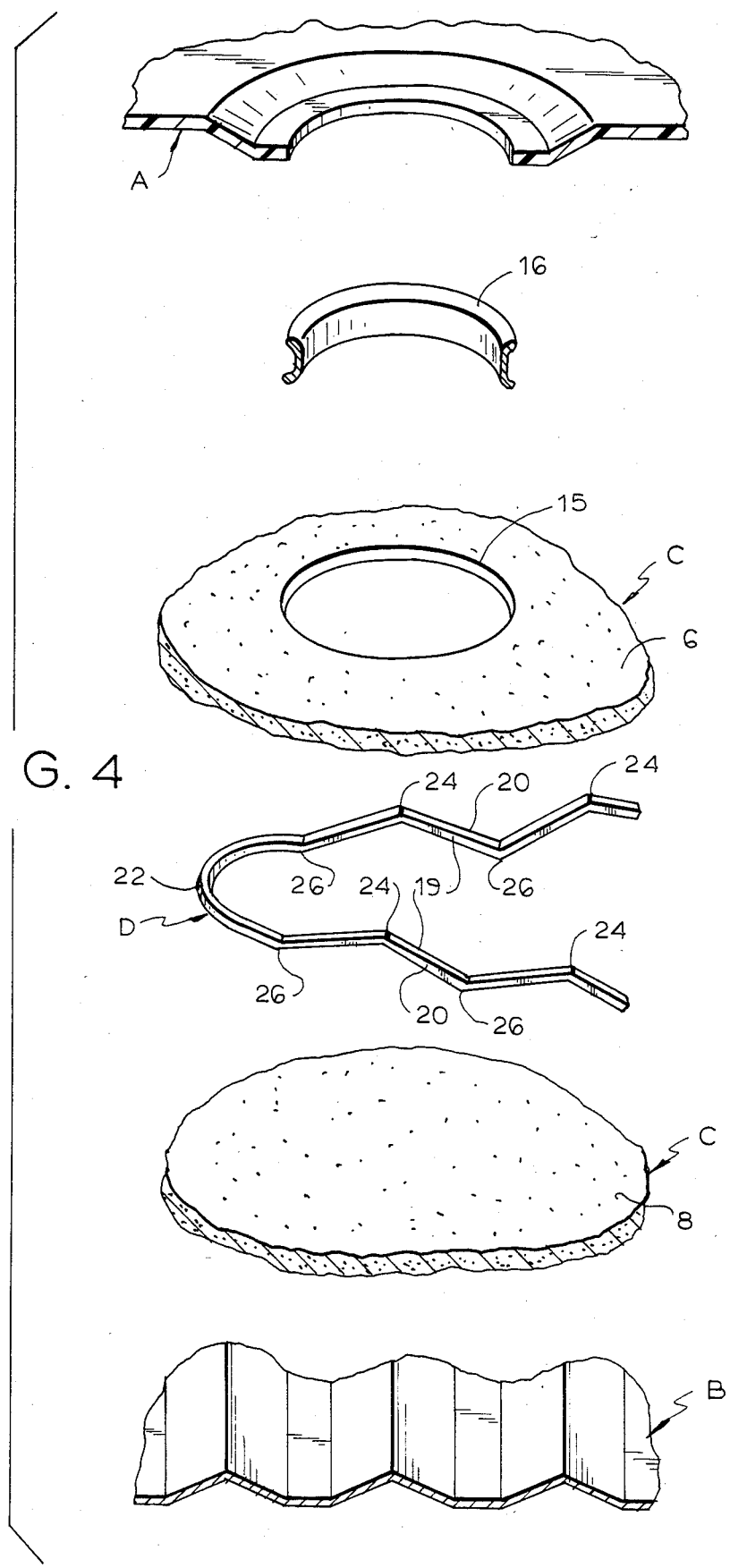
FIG. 4 is an exploded view, with some parts shown in fragmentary and cross-section form, of the structure shown in FIGS. 2 and 3.

It will be noted that, as shown, the lower vertices 26 of the spacer means D are so spaced from one another as to correspond to the spacing between the upwardly stamped ribs A of the lower cover wall B (see FIG. 3). This serves to fix the position of the spacer means D within the filter and to prevent any shifting in its position because of the forces exerted on it by the flow of the fluid being filtered.

The embodiment of FIGS. 6-9 discloses another embodiment of the spacer means D. In those figures the means D is formed integrally with the eyelet 16a which crimps the upper filter layer 6 to the top cover wall A around the opening 15. To that end the lower portion 16a' of the eyelet 16a (see FIG. 9) extends outwardly and, at two sides thereof, feet 32 depend therefrom by a distance corresponding to the desired spacing between the two filter layers. As here shown there are three feet 32 on each side of the combined eyelet-spacer means, with spaces being provided between the feet 32 on each side through which fluid can flow freely. The feet 32 are preferably spaced so as to fit within the ribs 14 on the lower cover wall B. In order not to damage either of the filter layers 6 or 8, the feet 32, at their outer end, are provided with upward extensions 34 adapted to engage the upper filter layer 6, those upper extensions 34 being provided with outwardly extending lips 36 to provide better support for the upper filter layer 6 and to minimize the possibility of damage thereto.

The spacer means embodiment of FIGS. 6-9 has some advantages over the embodiment of FIGS. 1-5. It involves the use of fewer parts and it more positively positions the spacer means. On the other hand, it may under some circumstances impede the flow of fluid through the filter to a greater degree than the embodiment of FIGS. 1-5, and it cannot be used in conjunction with preexisting filters, whereas the spacer means embodiment of FIGS. 1-5 can be applied to already existing filter assemblies.

Through the use of the spacer means D of the present invention the chamber inside the filter layers 6 and 8 is positively maintained open and hence optimum fluid flow through the filter is achieved. This is accomplished by structurally simple, sturdy and inexpensive means which may readily be incorporated into existing filter structures or designs without requiring modification of those filters.

While but a limited number of embodiments of the present invention have been disclosed, it will be apparent that many variations may be made therein, all within the scope of the present invention as defined in the following claims.

We claim:

1. In a fluid filter assembly comprising upper and lower walls sealingly connected to one another to define a chamber, said walls having spaced fluid inlet and outlet openings, and a filter sheet received inside the chamber and comprising upper and lower layers defining therebetween a fluid receiving space in fluid communication with said inlet opening, said outlet opening being located outside said space, and means sealingly connecting said upper filter sheet layer to one of said assembly walls around said fluid inlet, the improvement which comprises spacer means at least partially surrounding said inlet opening, interposed between said upper and lower filter sheets, engaging said sheets at points close to said inlet opening, and effective to maintain said filter sheets spaced from one another close to said inlet opening by an appreciable distance.

2. The fluid filter assembly of claim 1, in which said spacer means defines fluid flow passages through which the fluid to be filtered can flow readily from said inlet opening to the space between said filter sheet layers outside said spacer means.

3. The fluid filter assembly of claim 1, in which said spacer means is of one piece with said means sealingly connecting said upper filter sheet layer to said one of said assembly walls.

4. The fluid filter assembly of claim 3, in which said spacer means comprises legs extending toward and engaging said lower filter sheet layer.

5. The fluid filter assembly of claim 4, in which a plurality of said legs are located respectively on opposite sides of said sealingly connecting means with spaces between the legs on each side thereof.

6. In a fluid filter assembly comprising upper and lower walls sealingly connected to one another to define a chamber, said walls having spaced fluid inlet and outlet openings, and a filter sheet received inside the chamber and comprising upper and lower layers defining therebetween a fluid receiving space in fluid communication with said inlet opening, said outlet opening being located outside said space, and means sealingly connecting said upper filter sheet layer to one of said assembly walls around said fluid inlet, the improvement which comprises spacer means at least partially surrounding said inlet opening, interposed between said upper and lower filter sheets and effective to maintain said filter sheets spaced from one another by an appreciable distance, in which said spacer means comprises legs extending toward and engaging said lower filter sheet layer, and in which said legs have on their extremities laterally extending feet which engage said lower filter sheet layer.

7. The fluid filter assembly of claim 6, in which the other of said walls of said assembly has lands and grooves extending in a given direction, said feet extending from said legs laterally in said given direction.

8. The fluid filter assembly of claim 1, in which said spacer comprises a member separate from said means sealingly connecting said upper filter sheet layer to said one of said assembly walls.

9. In a fluid filter assembly comprising upper and lower walls sealingly connected to one another to define a chamber, said walls having spaced fluid inlet and outlet openings, and a filter sheet received inside the chamber and comprising upper and lower layers defining therebetween a fluid receiving space in fluid communication with said inlet opening, said outlet opening being located outside said space, and means sealingly connecting said upper filter sheet layer to one of said assembly walls around said fluid inlet, the improvement which comprises spacer means at least partially surrounding said inlet opening, interposed between said upper and lower filter sheets and effective to maintain said filter sheets spaced from one another by an appreciable distance, in which said spacer comprises a member separate from said means sealingly connecting said upper filter sheet layer to said one of said assembly walls, and in which said member comprises a U-shaped element extending partially around said inlet opening between said upper and lower filter sheet layers.

10. The fluid filter assembly of claim 9, said element proper having a height less than the desired spacing between said filter sheet layers, said element being shaped with at least one vertical undulation, thereby to space said layers from one another to the desired degree.

11. In the fluid filter assembly of claim 9, said U-shaped element defining arms connected by a reverse bend, and a part connected to and extending between said arms, thereby to retain said member in its desired U-shape.

12. The fluid filter assembly of claim 11, in which there are two such parts located on opposite sides of said inlet opening respectively.

13. In the fluid filter assembly of claim 10, said U-shaped element defining arms connected by a reverse bend, and parts connected to and extending between said arms, thereby to retain said member in its desired U-shape.

14. The fluid filter assembly of claim 13, in which there are two such parts located on opposite sides of said inlet opening respectively.

* * * * *